(12) United States Patent
Shimozono (10) Patent No.: US 8,888,198 B2
(45) Date of Patent: Nov. 18, 2014

(54) RUBBER CRAWLER

(75) Inventor: Nobuo Shimozono, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 422 days.

(21) Appl. No.: 13/265,415

(22) PCT Filed: Apr. 14, 2010

(86) PCT No.: PCT/JP2010/056655
§ 371 (c)(1),
(2), (4) Date: Oct. 20, 2011

(87) PCT Pub. No.: WO2010/122929
PCT Pub. Date: Oct. 28, 2010

(65) Prior Publication Data
US 2012/0032502 A1 Feb. 9, 2012

(30) Foreign Application Priority Data

Apr. 22, 2009 (JP) ................................. 2009-103676

(51) Int. Cl.
*B62D 55/24* (2006.01)
*B62D 55/253* (2006.01)

(52) U.S. Cl.
CPC ............ *B62D 55/244* (2013.01); *B62D 55/253* (2013.01)
USPC ....................................................... 305/169

(58) Field of Classification Search
CPC .... B62D 55/24; B62D 55/244; B62D 55/253; B62D 55/26
USPC ......... 305/157, 165, 166, 167, 169, 170, 171, 305/172, 173, 174, 176, 177
See application file for complete search history.

(56) References Cited

U.S. PATENT DOCUMENTS

| 6,106,083 A * | 8/2000 | Ono | 305/171 |
| 7,469,976 B2 * | 12/2008 | Nishimura | 305/169 |
| 2002/0024256 A1 * | 2/2002 | Hori et al. | 305/178 |

FOREIGN PATENT DOCUMENTS

| JP | 53-160141 U | 12/1978 |
| JP | 55-145072 A | 11/1980 |
| JP | 56-172485 U | 12/1981 |
| JP | 11-171059 A | 6/1999 |
| JP | 2002-145135 A | 5/2002 |
| JP | 2003-089366 A | 3/2003 |
| JP | 2006-248470 A | 9/2006 |

OTHER PUBLICATIONS

Supplementary European Search Report issued on Sep. 10, 2012 from the European Patent Office in corresponding European Application No. 10 76 6986.3.

* cited by examiner

*Primary Examiner* — S. Joseph Morano
*Assistant Examiner* — Jean Charleston
(74) *Attorney, Agent, or Firm* — Sughrue Mion, PLLC (57) ABSTRACT

The object of the present invention is to provide a rubber crawler having high traction force and excellent straight-ahead driving property and further improved durability by ensuring good soil-grasping property and soil-discharging property of the crawler body. The rubber crawler 1 has a crawler body 10 and a plurality of metal cores 30 buried in the crawler body and lugs 13 provided on an outer periphery side with they being divided into left and right sides across the central portion, the lugs divided into left and right sides being arranged in zigzag alignment with shifting of phase in a circumferential direction of the crawler body, wherein a contact area of the each lug 13 is divided into a central lug portion 20 and an outer lug portion 22. During running of the rubber crawler, the central lug portion 20 and the outer lug portion 23 of each of the lugs 13 connect to ground, and therefore, a force supporting the metal cores 30 are sufficiently ensured by the lugs to suppresses peeling of the crawler body from the metal cores or crack of the crawler body, which brings about enhancement of durability of the crawler body 10. Meanwhile, excellent soil-grasping property and soil-discharging property are maintained without destroying mud grasped by the groove 18 extending in the circumference direction, which brings about enhancement of straight-ahead driving property and suppresses occurrence of side slipping on a soft ground or a slope ground.

5 Claims, 5 Drawing Sheets

RUBBER CRAWLER

CROSS REFERENCE TO RELATED APPLICATIONS

This application is a National Stage of International Application No. PCT/JP2010/056655, filed on Apr. 14, 2010, which claims priority from Japanese Patent Application No. 2009-103676, filed Apr. 22, 2009, the contents of all of which are incorporated herein by reference in their entirety.

FIELD OF THE INVENTION

The present invention relates to a rubber crawler which comprises an endless band-shaped crawler body comprising an elastic material, and metal cores buried in the crawler body at predetermined intervals in the circumferential direction, each of the metal cores extending in the width direction.

DESCRIPTION OF THE RELATED ART

Recently, a rubber crawler is used widely in traveling sections of service vehicles for operating machines of building or construction, or for agricultural machines. The rubber crawler is provided with an endless band-shaped crawler body comprising an elastic material, and metal cores buried in the crawler body at predetermined intervals in the circumferential direction, holes for engaging with a drive wheel which are formed by a sprocket and which are provided between the metal cores adjacently provided at a central portion in a width direction of the crawler body, and a plurality of lugs provided in a protruding condition on the outer periphery side corresponding to a contact area. The rubber crawler is wound around a driving wheel, an idling wheel, and track rollers between the driving wheel and idling wheel, the driving wheel and idling wheel being provided on one and the other end of a crawler frame of a service vehicle.

The lugs formed the outer periphery side of the rubber crawler body are generally arranged such that they are arranged at fixed intervals in the circumferential direction with being extended in the width direction, and therefore the rubber crawler having the lugs show excellent traction property. However, when the rubber crawler is running on a soft ground or a slope ground, mud held between the adjacent lugs is discharged to the width direction outer side of the rubber crawler, which occasionally brings about the reduction of straight-ahead driving property of the rubber crawler.

As a countermeasure against the above-mentioned problem, for example, Patent Document 1 discloses a rubber crawler having straight-ahead driving property which is ensured by forming grooves extended in the circumferential direction on the contact area corresponding to the tread of the lugs.

Figure 5:
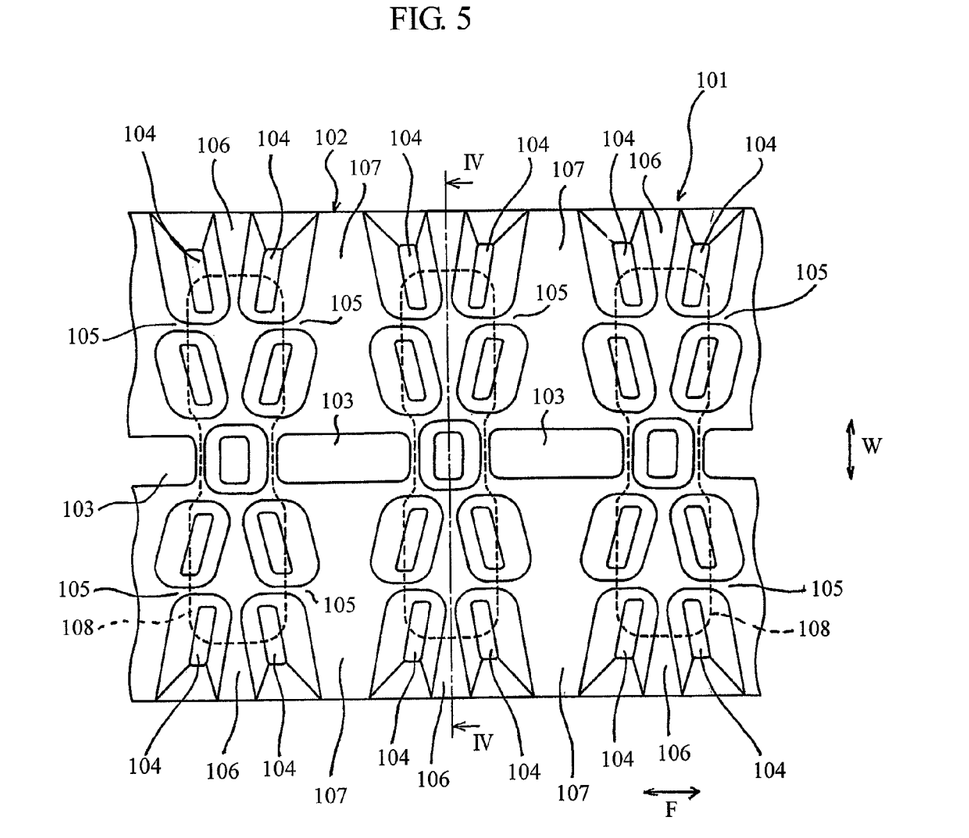
FIG. 5 is a plan view showing a major part of a conventional rubber crawler viewed from the outer periphery side of the rubber crawler.
Figure 6:
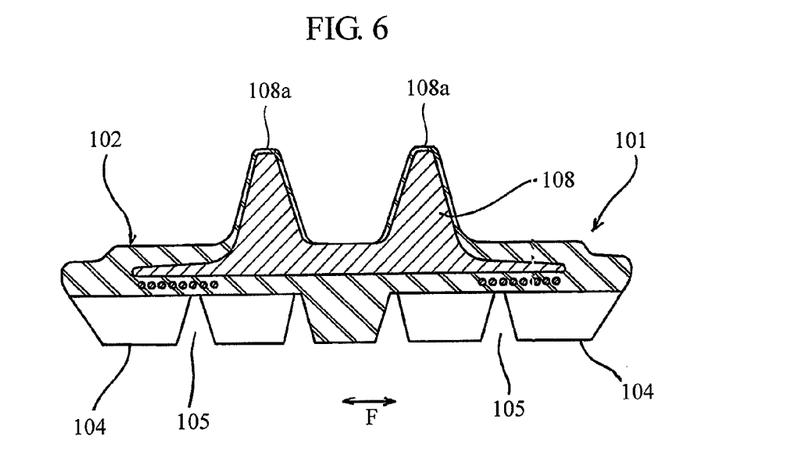
FIG. 6 is a section view of FIG. 5 taken at the section line VI-VI.

An outline of the rubber crawler 101 disclosed in Patent Document 1 is explained with reference to FIG. 5 and FIG. 6. FIG. 5 shows a plan view of a major part of the rubber crawler 101 viewed from the outer periphery side of the rubber crawler. FIG. 6 shows a section view obtained by viewing FIG. 5 from VI-VI line. An arrow F represents the circumferential direction of the rubber crawler 101 and an arrow W represents the width direction.

In this rubber crawler 101, metal cores obtained by forming in a protruding condition a surface 108a that track rollers pass through is buried in an endless band-shaped crawler body 102 comprising an elastic material, the metal cores being provided in fixed intervals in the circumference direction of the rubber crawler body 102, and holes 103 for engaging with a drive wheel are opened between the metal cores 108 adjacently provided at a central portion in a width direction of the crawler body. A pair of lugs 104 arranged in the same circumference direction position as the metal cores 108 and extended in the width direction are protruded oppositely on the outer periphery side of the crawler body 102, whereby a groove 105 extending in the circumference direction between the lugs 104 is formed. Further, a concave groove 106 is formed continuously in the width direction between the opposite lugs 104.

In the rubber crawler 101 having the above-mentioned structure, when the rubber crawler is running on a soft ground or a slope ground, mud entered into the concave groove 106 and the groove 105 is compressed and held by the lugs 104. Therefore, between the held mud and the ground, a share force or friction force is added, and it is suppressed that the mud entered into the concave groove 106 and the groove 105 is discharged from the width direction outer side of the rubber crawler 101, whereby soil-grasping property is ensured to bring about enhancement of straight-ahead driving property.

LIST OF PATENT DOCUMENTS

Patent Document 1: JP55 (1980)-145072 A

DISCLOSURE OF THE INVENTION

Problem to be Solved by the Invention

According to Patent Document 1, a groove 105 extended in the width direction is formed in the lug 104 arranged in the same circumference direction position as the metal cores 108 in the outer periphery side of the crawler body 108, which brings about enhancement of straight-ahead driving property.

However, the groove 105 extended in the width direction is relatively deeply formed between the lugs 104, and therefore it becomes difficult to discharge the mud entered and compressed into the groove 105 whereby the mud is accumulated in the groove 105 to damage the function of a concave groove 106, which brings about the reduction of straight-ahead driving property.

Further, in the circumference direction of the rubber crawler body 102, spring characteristics in an up-down direction in the portion having a metal core 108 and a pair of lugs 104 is greatly different from the spring characteristics in the portion having no metal core 108 and no lugs 104. Therefore the metal cores 108 are not stably supported and hence vibration of the metal cores 108 is increased, which is apt to generate running vibration derived from the decline (fall) of track rollers passing through pass surfaces 108a of the metal cores 108. With the vibration of the metal cores 108, peeling of the crawler body 102 from the metal cores 108 or crack of the crawler body 102 occur to induce breakage or abrasion of the lugs 104, which makes an effect on performances such as traction force and straight-ahead driving property and further may bring about reduction of durability.

In view of the above-mentioned problems, the object of the present invention is to provide a rubber crawler having high traction force and excellent straight-ahead driving property obtained by ensuring good soil-grasping property and soil-discharging property of the crawler body and further improved durability.

Means for Solving Problem

The present invention described in claim 1 to achieve the object can be provided by a rubber crawler comprising;

an endless band-shaped crawler body comprising an elastic material, a plurality of metal cores buried in the crawler body at predetermined intervals in a circumferential direction of the crawler body, each of the metal cores extending in a width direction of the crawler body, holes for engaging with a drive wheel provided at a central portion in the width direction of the crawler body and at predetermined intervals in the circumferential direction of the crawler body, and lugs provided on an outer periphery side of the crawler body with they being divided into left and right sides across the central portion in the width direction, the lugs divided into left and right sides being arranged in zigzag alignment with phase shift in the circumferential direction of the crawler body, wherein each of the lugs is provided with a groove, which is inclined from the central portion to the circumferential direction with respect to the width direction, and which is extended to the circumferential direction in a width direction central portion of a contact area of the each lug to divide the lug into a central lug portion having a central contact area and an outer lug portion having an outer contact area, and the central contact area and the outer contact areas are continuously in contact with ground in running.

According to the above-mentioned invention, during running of the rubber crawler, the central contact area of the central lug portion and the outer contact area of the outer lug portion continuously and sequentially connect to ground, and the outer contact area of the outer lug portion and the central contact area of the central lug portion continuously and sequentially connect to ground, and hence the central contact area and outer contact area of each of the lugs connect continuously to ground in seamless manners. Therefore, the variation of the spring characteristics in an up-down direction with respect to the circumference direction of the rubber crawler body becomes extremely small in extent, and thus the supporting force of the metal cores are sufficiently ensured to suppress the vibration of the metal cores. Further, the reduction of the vibration of the metal cores prevents peeling of the crawler body from the metal cores or crack of the crawler body, and moreover suppresses the induction of breakage or abrasion of the lugs to bring about enhancement of durability. Meanwhile, the vibration by the running is suppressed and the groove extending in the circumference direction formed on the lugs provided on the crawler body having suppressed damage and abrasion enables the retention of mud, which brings about enhancement of straight-ahead driving property and suppresses occurrence of side slipping on a soft ground or a slope ground.

In the preferred embodiment of the rubber crawler described in claim 2, which has the constitution of claim 1, the central lug portion and the outer lug portion each cover a part of a common metal core of the metal cores in planar view.

According to the above-mentioned embodiment, a force supporting the metal cores is highly ensured by the central lug portion and the outer lug portion of the lugs to suppress the vibration of the meta cores to reduce the running vibration, and the central lug portion and the outer lug portion are supported by the metal cores to reduce their load, whereby the occurrence of pealing of the crawler body from the metal cores or cracking of the crawler body is suppressed. Further, the compressive strength of the central lug portion and the outer lug portion is enhanced by the metal cores, whereby excellent soil-grasping property and soil-discharging property are maintained by the groove in the circumference direction to enhance straight-ahead driving property.

In the preferred embodiment of the rubber crawler described in claim 3, which has the constitution of claim 1, the central lug portion and the outer lug portion each is provided to be present astride two adjacent metal cores in the circumferential direction in planar view, and both the portions are into contact with a common one of the metal cores.

According to the above-mentioned embodiment, a force supporting each of the metal cores is highly ensured by the central lug portion and the outer lug portion of the lugs to suppress the vibration of the meta cores, and the central lug portion and the outer lug portion are supported by the metal cores to reduce their load, whereby the occurrence of pealing of the crawler body from the metal cores or cracking of the crawler body is suppressed. Further, the compressive strength of the central lug portion and the outer lug portion is enhanced by a plurality of metal cores, whereby excellent soil-grasping property and soil-discharging property by the groove extending in the circumference direction are maintained to enhance straight-ahead driving property In the preferred embodiment of the rubber crawler described in claim 4, which has the constitution of any of claims 1-3, the outer lug portion covers at least a part of tip(s) of the metal cores in planar view.

According to the above-mentioned embodiment, occurrence of pealing of the crawler body from a tip of the metal core or cracking of the crawler body on a tip of the metal core is suppressed, whereby the crawler body having the lugs is improved in durability.

In the preferred embodiment of the rubber crawler described in claim 5, which has the constitution of any of claims 1-4, a height of the groove is smaller than that of the lugs According to the above-mentioned embodiment, the groove is formed with a relatively small depth, and therefore good soil-discharging property is ensured, whereby excellent soil-grasping property and soil-discharging property are maintained without the retention of mud in the groove to enhance straight-ahead driving property. On the same time, the lug is formed by integral molding without dividing into the central lug portion and the outer lug portion to ensure stiffness strength of the lugs, which brings about enhancement of durability.

Effect of the Invention

According to the above-mentioned invention, during running of the rubber crawler, the central contact area of the central lug portion and the outer contact area of the outer lug portion of each of the lugs connect continuously to ground in seamless manners, and therefore, a force supporting the metal cores are sufficiently ensured to suppress the vibration of the metal cores, which suppresses peeling of the crawler body from the metal cores or crack of the crawler body to bring about enhancement of durability of the crawler body. Meanwhile, excellent soil-grasping property and soil-discharging property are maintained without destroying mud grasped by the groove extending in the circumference direction between the central lug portion and the outer lug portion, which brings about enhancement of straight-ahead driving property and suppresses occurrence of side slipping on a soft ground or a slope ground.

MODE CARRYING OUT THE INVENTION

An embodiment of the rubber crawler is explained below with reference to FIGS. 1 to 4.

Figure 1:
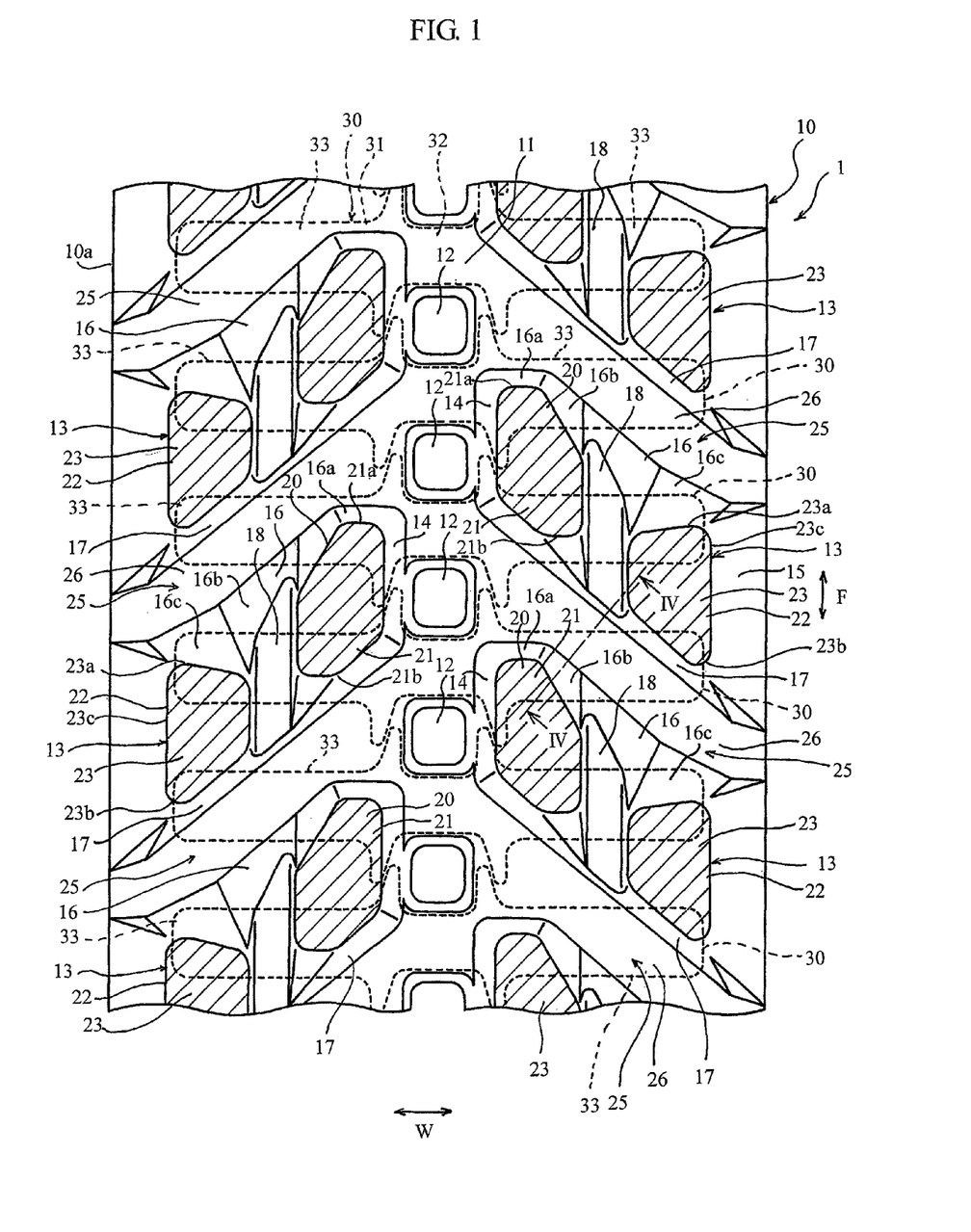
FIG. 1 is a plan view showing a major part of the rubber crawler according to an embodiment of the present invention viewed from an outer periphery side of the rubber crawler.
Figure 2:
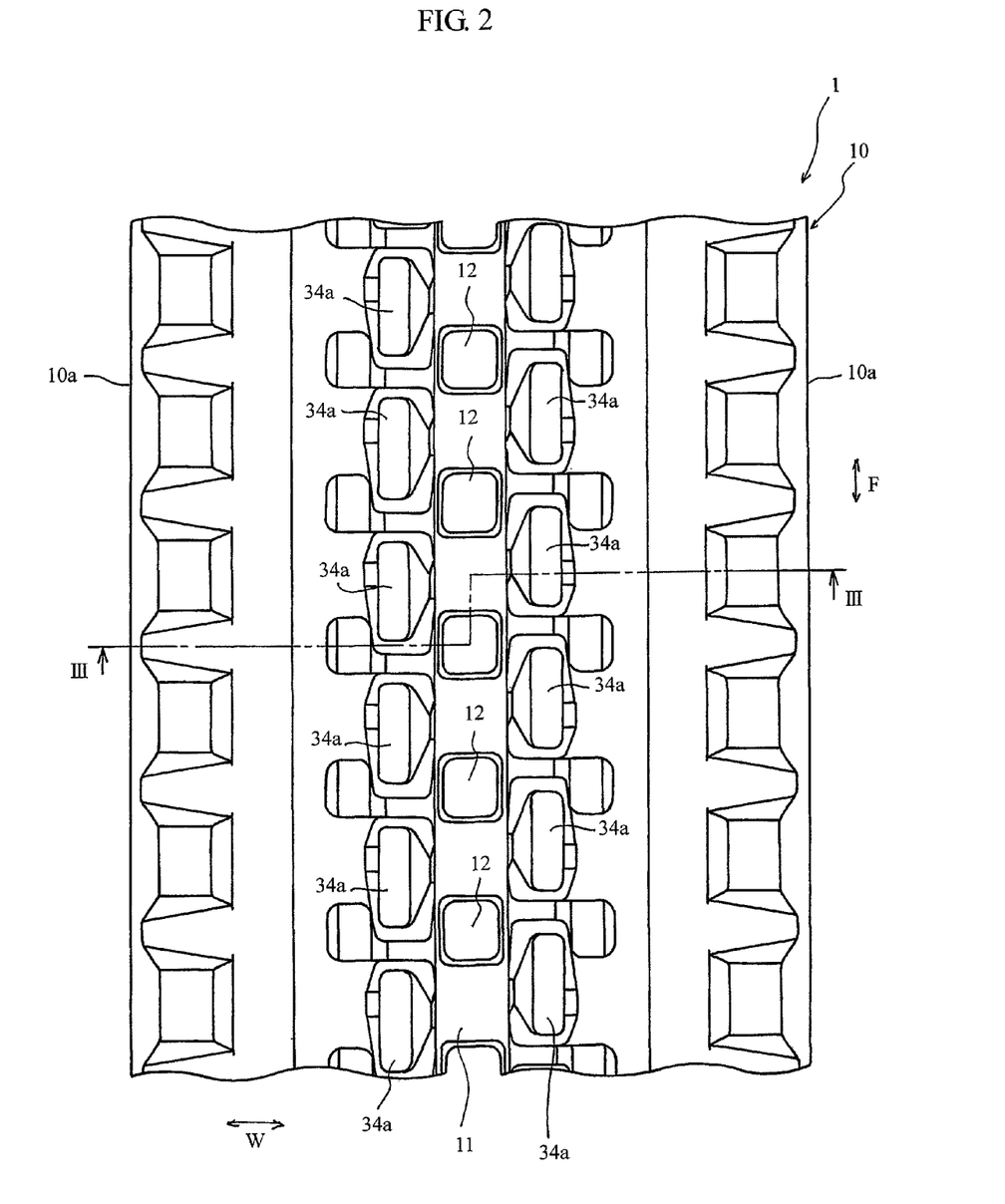
FIG. 2 is a plan view showing a major part of the rubber crawler viewed from an inner periphery side of the rubber crawler.
Figure 3:
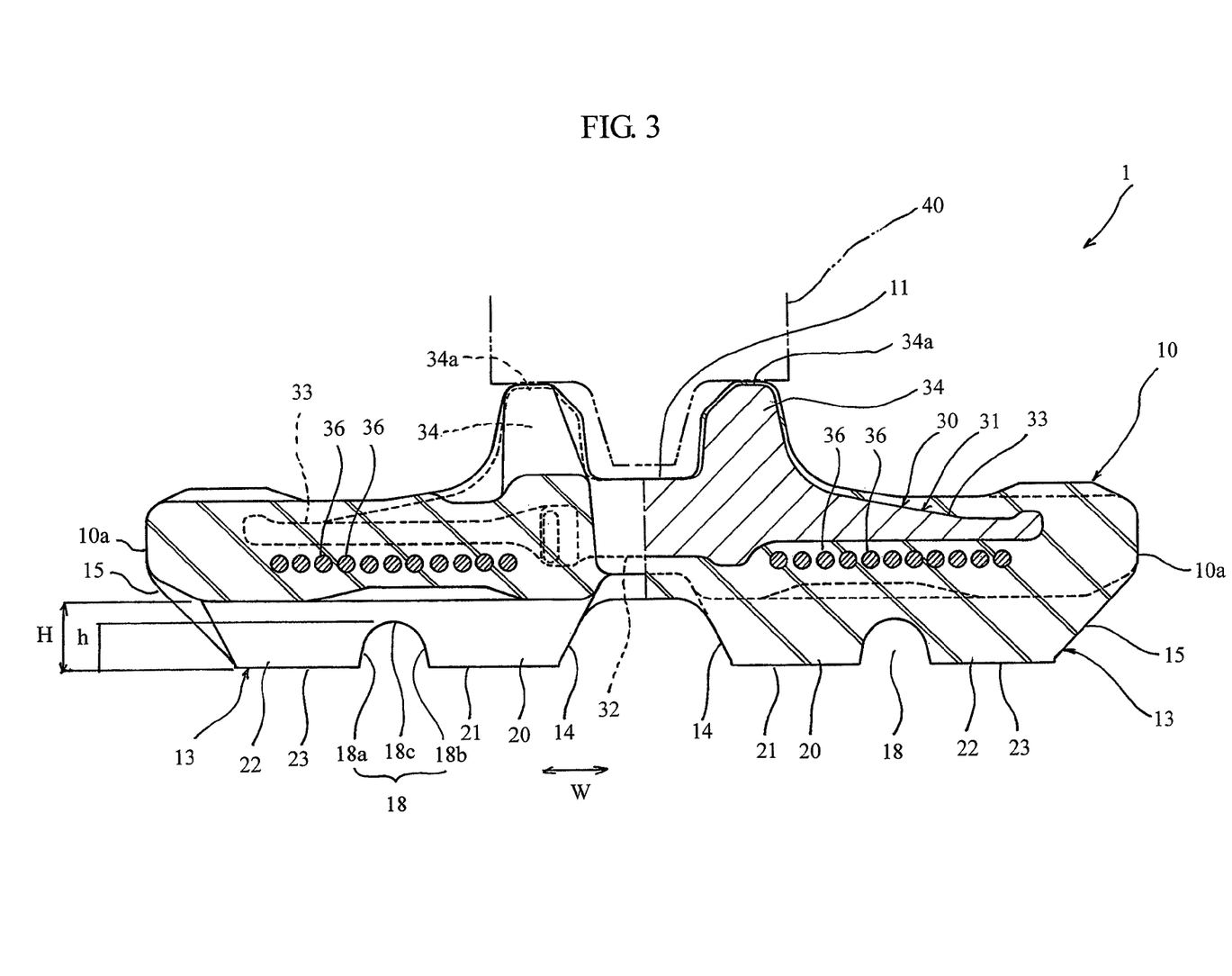
FIG. 3 is a section view of FIG. 1 taken at the section line
Figure 4:
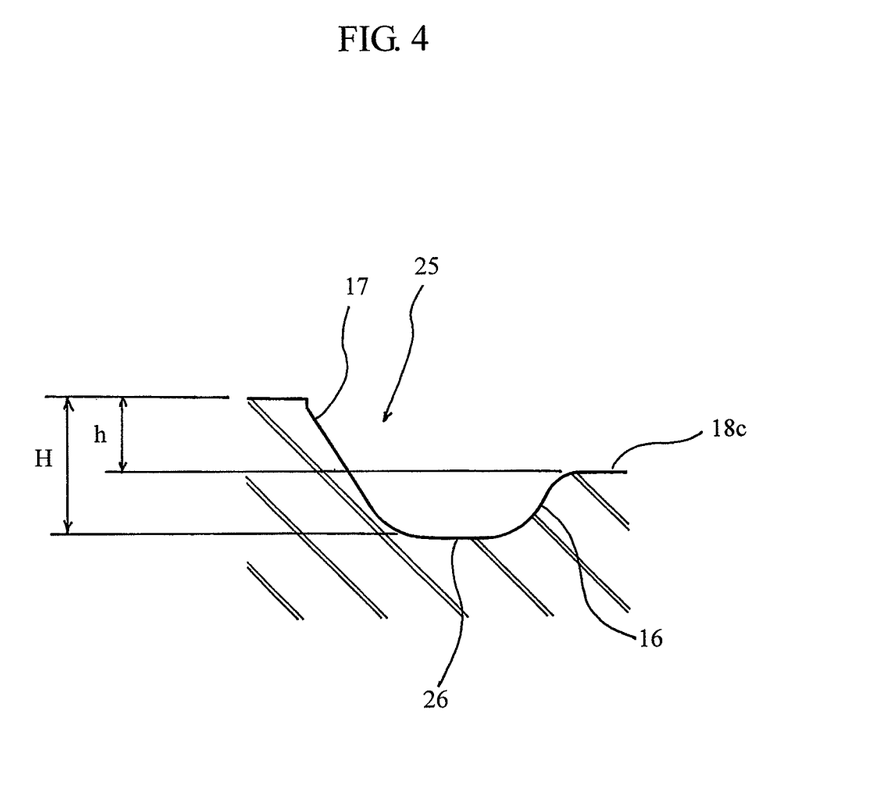
FIG. 4 is a section view of FIG. 1 taken at the section line IV-IV.

FIG. 1 is a plan view showing a major part of the rubber crawler viewed from an outer periphery side of the rubber crawler, FIG. 2 is a plan view showing a major part of the rubber crawler viewed from an inner periphery side of the rubber crawler, FIG. 3 is a section view of FIG. 1 taken at the section line and FIG. 4 is a section view of FIG. 1 taken at the section line IV-IV. In the figures, an arrow F represents a circumference direction of the rubber crawler 1, and an arrow W represents a width direction of the rubber crawler 1. The circumference direction represents the same direction as a front-back direction, and the width direction represents the same direction as a right and left direction.

In a rubber crawler 1, a plurality of metal cores 30 are buried in an endless band-shaped crawler body 10 comprising an elastic material at predetermined intervals in a circumferential direction of the crawler body, each of the metal cores extending in a width direction of the crawler body, circumference-direction tensile bodies 36 made of steel cord or the like in the outer periphery side of metal cores 30 are buried in the circumferential direction, holes 12 for engaging with a drive wheel are provided at a approximately central portion 11 in a width direction and at predetermined intervals in a circumferential direction of the crawler body, the drive wheel being formed by a sprocket wheel between the metal cores 30, and lugs 13 and concave portion 25 are alternatively formed in unity in the circumference direction.

As shown in FIGS. 1 and 3, each of the metal cores 30 buried in the crawler body 10 is provided with a metal core body 31 which is buried in the crawler body 10 and extended in the width direction of the crawler body 10, and the metal core body 31 has a central portion 32 engaging with a drive wheel and right and left blade portions 33 which are each protruded in the width direction from both ends of the central portion 32 to gradually reduce in the thickness with moving to the tip.

A pair of guide protrusions 34 protruded in the inner periphery side on the both sides at a distance from the central portion 32 of the metal core body 31 are provided in a protruding condition. A top surface 34a of each of the guide protrusions 34 is a passing side of a track roller. The track roller 40 is indicated by a virtual line in FIG. 3.

Lugs 13 provided on an outer periphery side of the crawler body 10 are divided into left and right sides across the central portion, on which holes for engaging with a drive wheel are arranged, in the width direction, and the lugs (opposite lugs) 13 divided into left and right sides are arranged in zigzag alignment with shifting phase (phase shift) by one pitch in a circumferential direction of the crawler body 10.

Each of the lugs 13 is inclined in the circumference direction with respect to the width direction from a position adjacent to the central portion 11 and extended to a side end 10a, which forms an approximately trapezoid in cross section.

Each of the lugs 13 is composed of a central side inclined surface 14, a side portion (lateral) side inclined surface 15, a front side inclined surface 16 and a back side inclined surface 17, and formed in the form of an approximately trapezoid in cross section having an contact area corresponding to a tread. The central side inclined surface 14 is extended continuously from the central portion 11. The side portion side inclined surface 15 is extended in the circumferential direction with respect to the central side inclined surface 14, i.e., connected to the side end 10a of the crawler body 10 and extended in the circumferential direction with being shifted backward in the contact condition. The front side inclined surface 16 is composed of a front inner side inclined surface 16a extended in the width direction from a forward end of the central side inclined surface 14, a front intermediate inclined surface 16b is inclined backward with respect to the circumference direction from the width direction end of the front inner side inclined surface 16a, and a front outer side inclined surface 16c extended in the approximately width direction from the width direction end of the front intermediate inclined surface 16b and continuously connected to a forward end of the side portion side inclined surface 15. The back side inclined surface 17 is inclined in the circumference direction from a posterior end of the central side inclined surface 14 and continuously connected to a posterior end of the side portion side inclined surface 15.

The back side inclined surface 17 and the front side inclined surface 16 of the adjacent lugs 13 and a bottom portion between these surfaces forms a concave portion 25 continuously connected from the central portion 11 to the side end 10a between the adjacent lugs 13.

A groove 18 is formed in a central portion in the width direction of the each of the lugs 13. The grove is continuously extended in the circumference direction and opened to the contact area side in the width direction central portion of the contact area of the lug 13. The groove 18 extended in the circumference direction divides the lug 13 into a central side lug portion 20 having a central side contact area 21 and an outer side lug portion 22 having an outer side contact area 23. In FIG. 1, the central side contact area 21 of the central side lug portion 20 and the outer side contact area 23 of the outer side lug portion 22 having an outer side contact area 23 are hatched.

A forward end 21a and a posterior end 21b of the central side contact area 21 of the central side lug portion 20 are connected to the front inner side inclined surface 16a and the back side inclined surface 17, respectively. A forward end 23a and the posterior end 23b of the outer side contact area 23 of the outer side lug portion 22 are connected to the front outer side inclined surface 16c and the back side inclined surface 17, respectively. A forward end 22a of the outer side contact area 22 is located between a forward end 21a and a rear end 21b of the central side contact area 21, while a rear end 22b of the outer side contact area 22 is located backward from a rear end 21b of the central side contact area 21.

The groove 18, which is provided in the form of concave on the lug 13 and which divides into the lug 13 into the central side lug portion 20 and the outer side lug portion 22, is provided with a bottom portion 18c and lateral sides 18a and 18b opposite each other. Further, the groove 18 has a section view showing a letter of "U" or "C" in which the lateral sides 18a and 18b gradually separate from each other with moving from the bottom portion 18c to the central side contact area 21 of the central side lug portion 20 and the outer side contact area 23 of the outer side lug portion 22. A depth of the groove 18, i.e., a dimension "h" of from the central side contact surface 21 and the outer side contact area 23 to the bottom portion 18c, corresponds to, for example, ⅔ to ½ of height dimension "H" of the lugs 13 as shown in FIGS. 3 and 4 which are a section view of FIG. 1 taken at the section line IV-IV. The central side lug portion 20 and the outer side lug portion 22 are formed by continuously connecting to the groove 18 in the base end side. In this way, the central side lug portion 20 and the outer side lug portion 22 can be continuously formed in a united manner without dividing into the central side lug portion 20 and the outer side lug portion 22 by the groove 18 by setting the depth of the groove 18 to dimension less than height of the lugs 13, whereby durability of the lugs 13 can be enhanced with ensuring its stiffness strength.

Each of the lugs 13 has such size that it is present astride three metal cores 30 in the circumference direction in planar view. The central lug portion 20 in the embodiment has such size that it is present astride the central side contact area 21 and two metal cores 30 which are adjacent to the forward end 23a and the posterior end 23b of the central side contact area 21, whereas the outer side lug portion 22 in the embodiment has such width-direction size that it is present astride the outer side contact area 23 and two metal cores 30 which are adjacent to the forward end and the posterior end of the outer side contact area 23 and that the lateral side 23c covers at least a part of the tip portions of the blade portions 33 of the metal cores 30. Further, at least a part of the lug 30 arranged in the intermediate area of the lugs 30 are covered by the central side contact area 21 of the central lug portion 20 and the outer side contact area 23 of the outer side lug portion 22.

In the rubber crawler 1 constructed as above, the forward end 21a and posterior end 21b of the central side contact area 21 of the central lug portion 20 of the lug 13 come continuously and sequentially into contact with the ground during forward run of the rubber crawler 1, and in the meantime, the forward end 23a of the outer side contact area 23 of the outer side lug portion 22 come into contact with the ground and therefore the central side contact area 21 and the outer side contact area 23 also come into contact with the ground. In the same time, the outer side contact area 23 comes into contact with the ground, and in the meantime the central lug portion 20 and the forward end 21a of the central side contact area 21 of the central lug portion 20 of the subsequent lug 13 comes into contact with the ground.

In this way, the central side contact area 21 of the central lug portion 20 and the outer contact area 23 of the outer lug portion 22 c of each lug 13 continuously and sequentially connect to ground in seamless manners. Therefore, the variation of the spring characteristics in an up-down direction with respect to the circumference direction of the rubber crawler body 10 becomes extremely small in extent, and thus the metal cores 30 are sufficiently supported in the circumference direction by the crawler body 10 to suppress the vibration of the metal cores 30. Further, each of the metal cores 30 is sufficiently supported by the central lug portion 20 and the outer lug portion 22 of the lugs 13 to suppress the vibration of the metal cores 30. Therefore the reduction of the vibration of these metal cores 30 bring about prevention of peeling of the crawler body 10 from the metal cores 30 or crack of the crawler body 10. Furthermore, the central side contact area 21 of the central lug portion 20 and the outer contact area 23 of the outer lug portion 22 are supported by two adjacent metal cores 30, respectively, and the tip portion of the metal cores 30 reaches the side edge 23c of the outer contact area 23, whereby each of the lugs 13 is widely supported by three metal cores 30 to enhance stiffness for supporting the lug 13. Thereby, the deformation of the lug is suppressed and therefore breakage or abrasion of the lugs 13 is suppressed to bring about enhancement of durability of the crawler body 10.

Further, the central side contact area 21 and the outer contact area 23 of each of the lugs 13 is arranged astride the blade portions 33 of three metal cores 30, and hence force supporting the metal core of each of the lugs 13 is further enhanced, which brings about suppression of the vibration of the metal cores 30 to greatly reduce the decline amount of the track roller 36, which means the declining extent of the track roller 36 between the metal cores 30 generated when the track roll 36 passes through the top surface 34 of the guide protrusion 34. Furthermore the vibration during the running of the rubber crawler is greatly reduced by arranging the lugs 13 in left and right sides in zigzag alignment. The reduction of the vibration during the running of the rubber crawler brings about prevention of occurrence of peeling of the crawler body 10 from the metal cores 30 or crack of the crawler body 10, and the central lug portion 20 and the outer lug portion 22 are sufficiently supported by the metal cores 30, which reduces the load to suppress breakage or abrasion of the central lug portion 20, the outer lug portion 23 and the groove 18.

Moreover, the stiffness of the crawler body 10 becomes to homogeneous in the whole circumference, whereby occurrence of twist or deviation of the rubber crawler 1 can be prevented and simultaneously collision of the crawler body 10 with the drive wheel or idling wheel is reduced. Thereby, tap sound of the rubber crawler 1 becomes to reduce.

The lugs 13 formed on the outer periphery of the crawler body 10 is reduced in load by the reduction of running vibration or of vibration of the metal cores 30 and hence the initial shape of the lugs 13 can be maintained because of depression of breakage or abrasion caused by the running. In forward running of the rubber crawler 1, the range of from the forward end 21a of the central side contact area 21 to the posterior end 23b of the outer side contact area 23 continuously comes into contact with the ground, whereby the vibration can be reduced. The reduction of the vibration brings about effective use of the traction force of the crawler without destroy of mud grasped by the concave portion 25 between the lugs 11, whereby the traction force of the crawler can be sufficiently ensured. Further, mud which is grasped by the groove 18 extending in the circumference direction between the central lug portion 20 and the outer lug portion 22 and which is enhanced in compressive strength by application of load generated from the grounding and the plural metal cores 30 is pressurized without destroy to be retained, which brings about enhancement of soil-grasping property, and shear force and frictional force between this retained mud and the ground are sufficiently ensured to bring about enhancement of straight-ahead driving property.

Further, in the concave portion 25 formed between the adjacent lugs 13, the range between the back side inclined surface 17 and the front inner side inclined surface 16a opposite to the back side inclined surface 17 is gradually reduced in section area with moving from the central portion 11 to the side end 10a to form a tapered shape. Thereby, entering of mud from the central portion 11 is promoted, and continuously the mud in the range is aggressively guided to the side end 10a by means of a tapered shape formed by gradually increasing the section area of the range between the back side inclined surface 17 and the front intermediate inclined surface 16b with moving from the central portion 11 to the side end 10a. Furthermore, the range between the back side inclined surface 17 and the front outer side inclined surface 16c is gradually reduced in section area with moving to the side end 10a, and simultaneously an angle between the front outer side inclined surface 16c and the outer side contact area 23 is relatively increased compared with an angle between the front inner side inclined surface 16a and the central side contact area 21 with the front outer side inclined surface 16c being extended and inclined approximately in the width direction, and therefore mud introduced from the central side portion 11 of the concave portion 25 acts as pressing force in the downward and circumference directions by means of the front outer side inclined surface 16c. Thereby, excellent soil-discharging property can be obtained.

The relatively shallow groove 18 has a section view showing a letter of "U" or a semicircular arc and is formed by gradually separating the lateral sides 18a and 18b with moving from the bottom portion 18c formed by continuously connecting to the concave portion 25 to the central side contact area 21 and the outer lug portion 22 of the central lug portion 20, and thereby the relatively shallow groove 18 acquires excellent soil-discharging property. Therefore, mud is not left in the groove 18, and hence excellent soil-grasping property and soil-discharging property are maintained, which brings about enhancement of straight-ahead driving property and suppresses occurrence of side slipping on a soft ground or a slope ground.

The above-mentioned explanation describes an example that the central side contact area 21 of the central side lug portion 20 and the outer contact area 23 of the outer lug portion 22 are present astride the adjacent metal cores 30 in planar view. However, the present invention is not restricted to the range of the central side contact area 21 and the outer contact area 23. For example, an inclined surface forming the central side lug portion 20 and the outer side lug portion 22 may be present astride the adjacent metal cores 30.

EXPLANATION OF REFERENCE NUMBER

1 Rubber crawler
10 Crawler body
11 Central portion
12 Hole for engaging
13 Lug(s)
18 Groove
20 Central side lug portion
21 Central side contact area
22 Outer side lug portion
23 Outer side contact area
30 Metal core(s)

What is claimed is:

1. A rubber crawler comprising;
an endless band-shaped crawler body comprising an elastic material,
a plurality of metal cores buried in the crawler body at predetermined intervals in a circumferential direction of the crawler body, each of the metal cores extending in a width direction of the crawler body,
holes for engaging with a drive wheel provided at a central portion in the width direction of the crawler body and at predetermined intervals in the circumferential direction of the crawler body, and
lugs provided on an outer periphery side of the crawler body with they being divided into left and right sides across the central portion in the width direction, the lugs divided into left and right sides being arranged in zigzag alignment with phase shift in the circumferential direction of the crawler body,
wherein each of the lugs is inclined from the central portion to the circumferential direction with respect to the width direction, and each of the lugs is provided with a groove which is extended to the circumferential direction in a width direction central portion of a contact area of the each lug to divide the lug into a central lug portion having a central contact area and an outer lug portion having an outer contact area, and
the central contact area and the outer contact areas are continuously in contact with ground in running.

2. A rubber crawler as defined in claim 1, wherein the central lug portion and the outer lug portion each cover a part of a common metal core of the metal cores in planar view.

3. A rubber crawler as defined in claim 1, wherein the central lug portion and the outer lug portion each is provided to be present astride two adjacent metal cores in the circumferential direction in planar view, and both the portions are into contact with a common one of the metal cores.

4. A rubber crawler as defined in claim 1, wherein the outer lug portion covers at least a part of tips of the metal cores in planar view.

5. A rubber crawler as defined in claim 1, wherein a height of the groove is smaller than that of the lugs.

* * * * *